United States Patent [19]

Welsh

[11] Patent Number: 5,373,573
[45] Date of Patent: Dec. 13, 1994

[54] HIGH DENSITY FIBER OPTIC CONNECTOR

[75] Inventor: David E. Welsh, Tustin, Calif.

[73] Assignee: ITT Corporation, Secaucus, N.J.

[21] Appl. No.: 79,762

[22] Filed: Jun. 21, 1993

[51] Int. Cl.$^5$ ............................................. G02B 6/36
[52] U.S. Cl. ........................................ 385/69; 385/75;
385/86; 385/136
[58] Field of Search .................................. 385/53–56,
385/58–73, 75–87, 136, 138, 139

[56] References Cited

U.S. PATENT DOCUMENTS

| | | | |
|---|---|---|---|
| 3,947,182 | 3/1976 | McCartney | 385/54 |
| 3,963,323 | 6/1976 | Arnold | 385/62 |
| 4,178,068 | 12/1979 | Hoover | 385/78 |
| 4,279,469 | 7/1981 | Forman | 385/60 |
| 4,595,251 | 6/1986 | Moulin | 439/289 |
| 4,690,494 | 9/1987 | Hirose et al. | 385/60 |
| 4,735,480 | 4/1988 | Levinson et al. | 385/58 |
| 4,747,658 | 5/1988 | Borsuk et al. | 385/78 |
| 4,804,243 | 2/1989 | Borsuk et al. | 385/76 |
| 4,812,006 | 3/1989 | Osborn et al. | 385/69 |
| 4,884,864 | 12/1989 | Ellis et al. | 385/55 |

FOREIGN PATENT DOCUMENTS 63-307408 12/1988 Japan .

Primary Examiner—Frank Gonzalez
Attorney, Agent, or Firm—Thomas L. Peterson

[57] ABSTRACT

A fiber optic connector is described, which has a retention clip (100, FIG. 4) that is part of the terminus so the clip is removed with the terminus from a connector housing, to enable replacement of a broken clip as well as to provide a more compact and low cost connector. The clip has a rear end (102) forming a ring that slides along the terminus body, and has a plurality of tines (104–107) that extend forwardly and radially outwardly. The free forward end of each tine has a rearwardly-facing clip shoulder (112) which abuts a forwardly-facing housing shoulder (114) so the clip cannot be removed in a rearward direction until the tines are deflected together. The front ends of the tines abut the rear end (92) of a spring that lies around the terminus body. The termini of the plug and receptacle connectors are identical except that one of the connectors (14, FIG. 5) uses a spacer (140) in place of a helical spring.

9 Claims, 4 Drawing Sheets

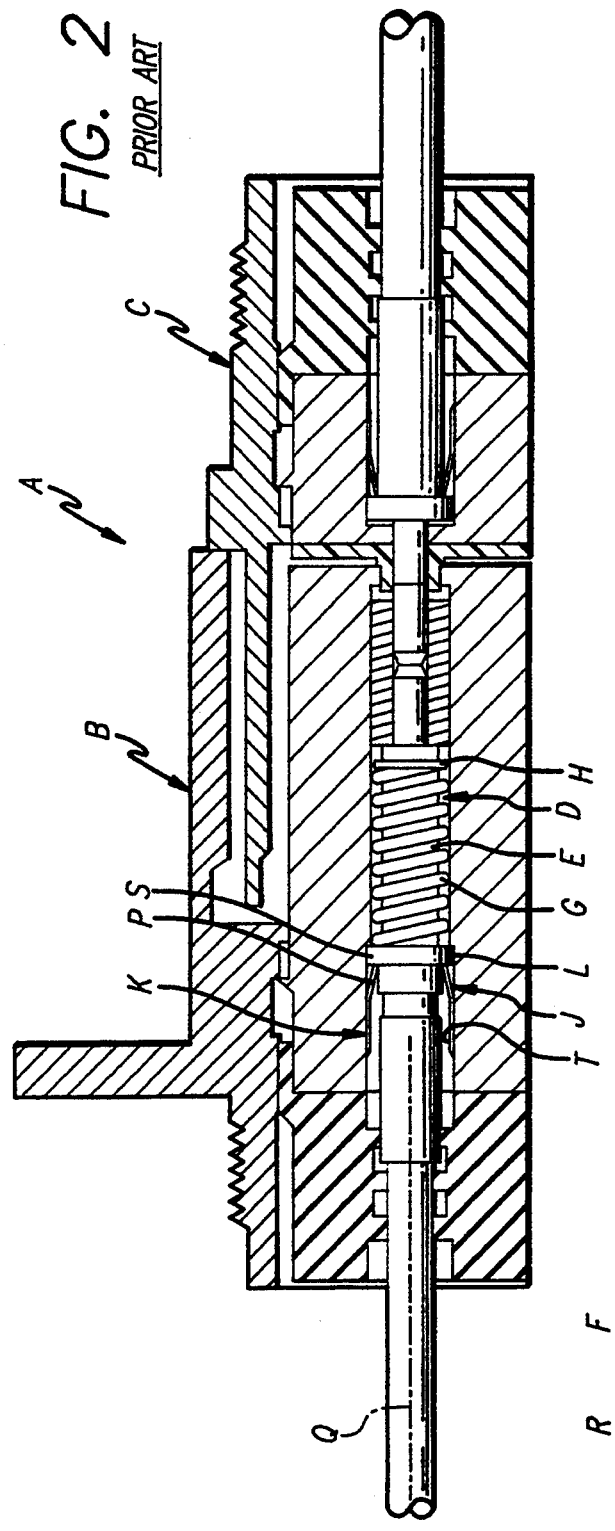
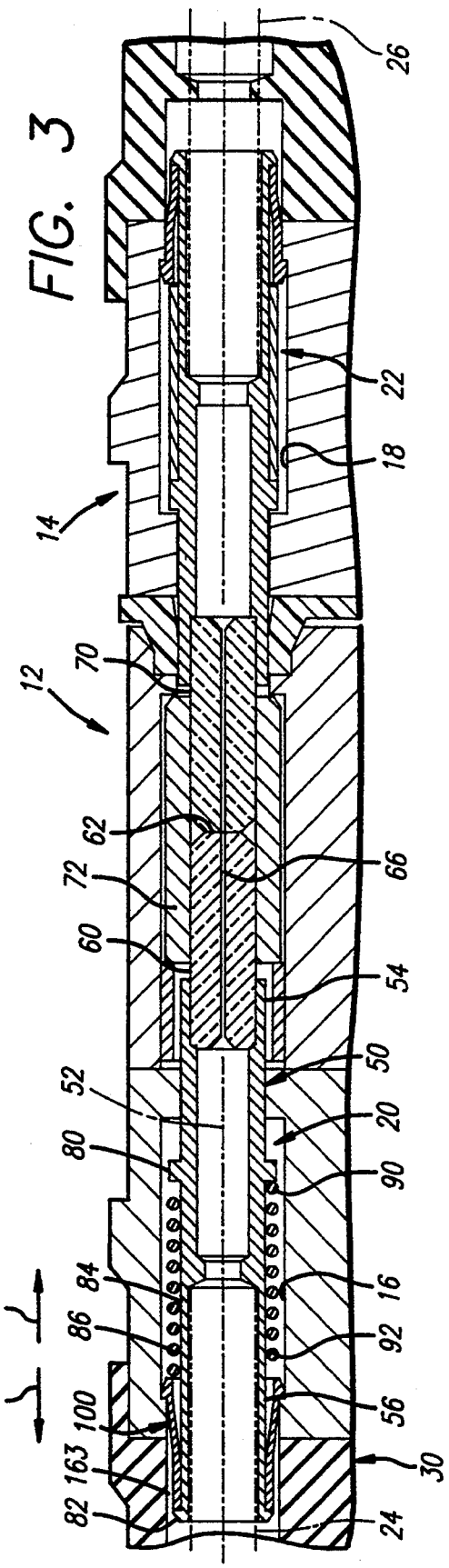
FIG. 2 PRIOR ART
FIG. 3

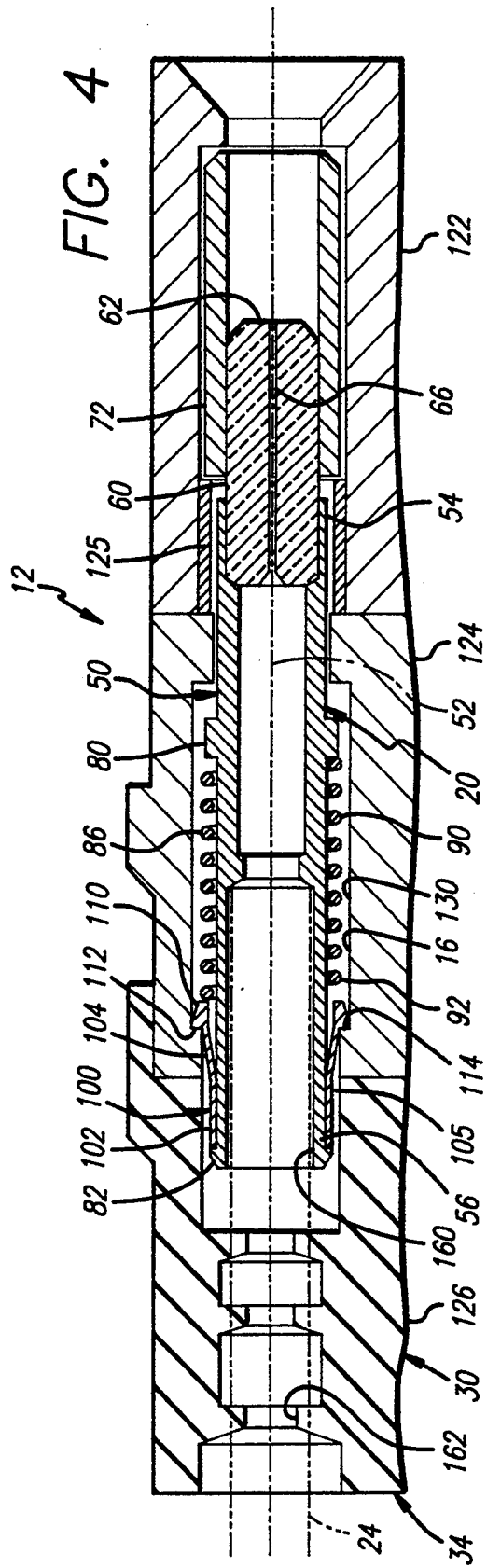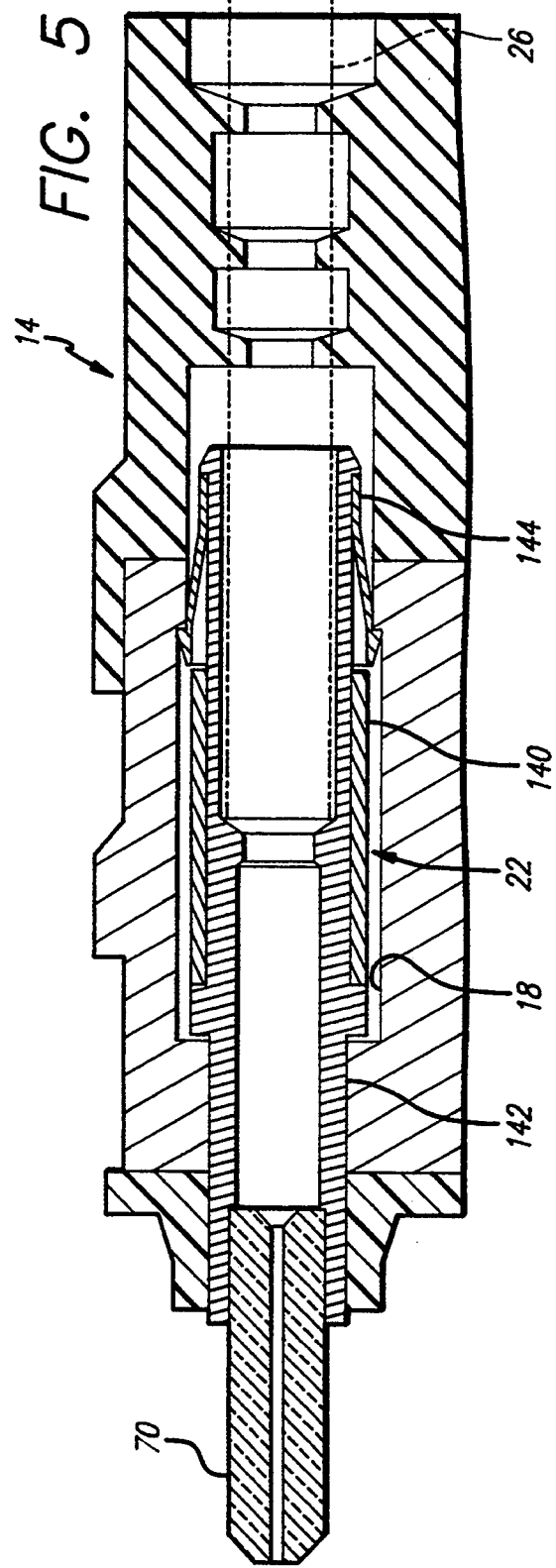

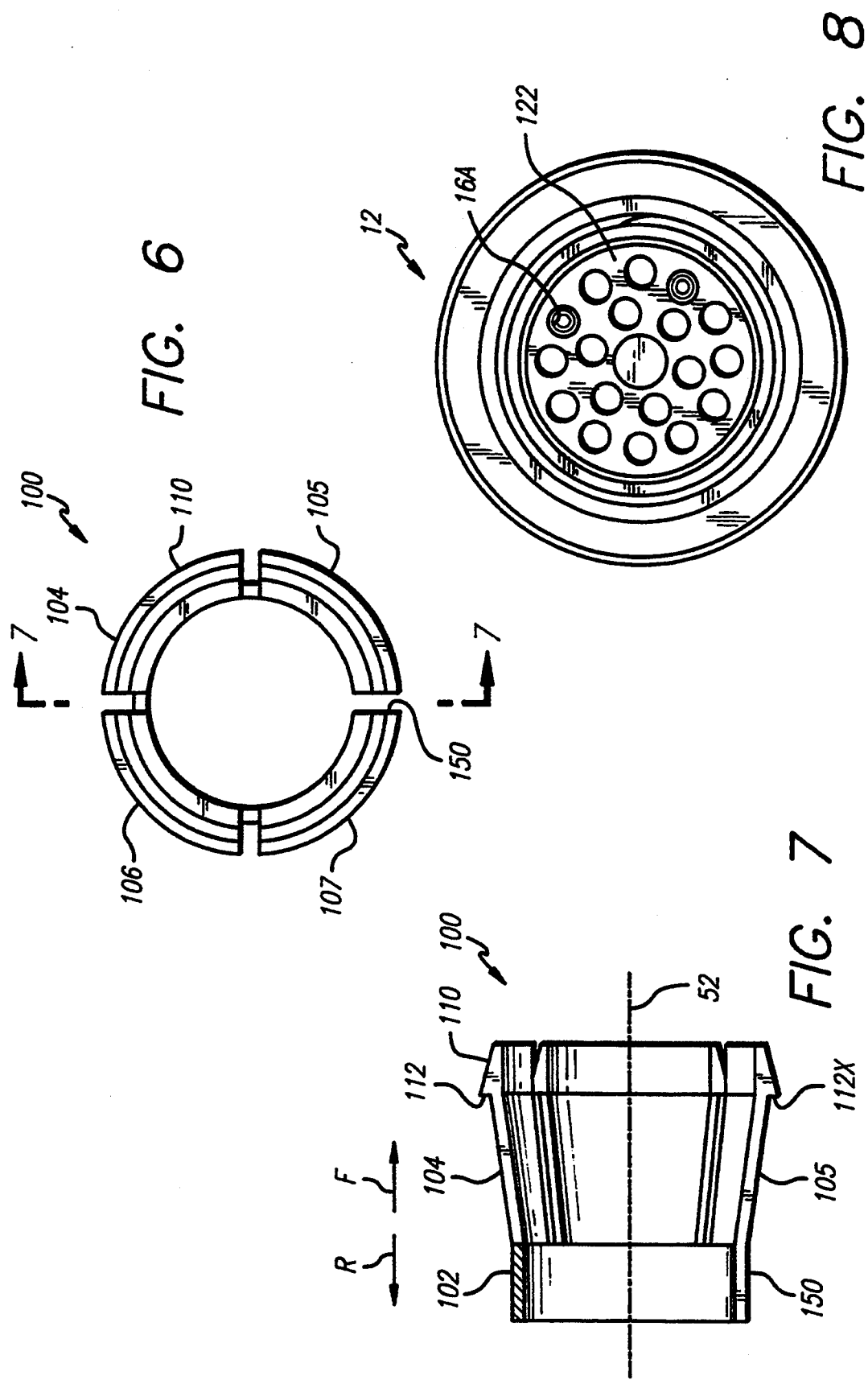

HIGH DENSITY FIBER OPTIC CONNECTOR

BACKGROUND OF THE INVENTION

A presently used fiber optic connector arrangement uses a terminus in each connector that includes a ceramic ferrule, with the front tip of an optical fiber lying flush with the tip of the ferrule. The ferrules of mating connectors have their tips abutting, with the ferrules maintained concentric by a guide sleeve lying in one of the connectors. It is necessary to clean each terminus to remove wear debris that could reduce optical coupling. To facilitate removal, each terminus is held in a passage of the connector housing by a clip that can be released by a release tool. To facilitate mounting of the guide sleeve near the front of one of the connectors, it is desirable to enable the terminus to be installed and removed from the rear of the housing.

Present optical termini are built to work with contact retention mechanisms identical to those of electrical contacts. In electrical contacts, the insert which contains the electrical contacts has to be constructed of easily formed insulative materials such as injection molded plastic. Because of the relatively high thermal coefficient of expansion of common engineering plastics, because of the tolerances encountered in injection molding, and because the inserts align with only limited accuracy during mating, each contact-receiving passage has to provide substantial space around each contact, especially to receive the rear release clip. A rear release clip is permanently installed in each housing passage. As a result, if a clip becomes damaged, then that housing passage might become nonusable. The permanently installed clip has to allow passage of the spring and all other portions of the terminus lying forward of the clip, so the clip has to be expandable to a considerable diameter and therefore has to have a large diameter. Moreover, the clips must be dielectrically isolated from one another, requiring a considerable space between the clips.

The termini for standard plug optical connectors are usually very different from the termini for standard receptacle optical connectors. A fiber optic connector which enabled removal of the clip with the rest of the terminus so a damaged clip could be removed, which used common components on pin and socket termini, and which enabled the connector to be constructed with more closely spaced termini, would be of considerable value.

SUMMARY OF THE INVENTION

In accordance with one embodiment of the present invention, a fiber optic connector and a retention clip therefor are provided which enable a connector with a given number of passages and corresponding termini to be made more compact, and which enable removal of a damaged clip and simplified construction of each terminus. Each socket or female terminus includes a body with a front flange and a spring lying about the body with the spring front end abutting the front flange. A clip device for abutting the rear end of the spring, has a rear end slidably mounted on the body and a plurality of tines extending forwardly and radially outwardly from the rear end and having free front ends. Each tine front end forms a rearwardly-facing clip shoulder. Each housing passage forms a forwardly-facing housing shoulder. The clip is moved forwardly into the housing until the clip shoulders lie immediately forward of the housing shoulder, so the clip normally cannot move rearwardly because of such shoulder-to-shoulder engagement.

The free ends of the tines can directly engage the rear end of the spring which lies about the body. This reduces the number of parts of the terminus. The body includes a rear flange which abuts the rear end of the clip to keep the clip on the body. The clip can be formed with its rear end of ring shape except with a slot therein which allows the ring to be expanded to install it on the body.

The pin or male terminus is identical to the socket termini except that the spring is replaced by a spacer. Alternatively, the spacer feature may be incorporated into the terminus body.

The novel features of the invention are set forth with particularity in the appended claims. The invention will be best understood from the following description when read in conjunction with the accompanying drawings.

BRIEF DESCRIPTION OF THE DRAWINGS

FIG. 2 is a partial sectional side view of mated plug and receptacle connectors of the prior art.

FIG. 3 is an enlarged view of a portion of the connector assembly of FIG. 1.

FIG. 4 is a partial sectional view of only the receptacle connector of the assembly of FIG. 3.

FIG. 5 is a sectional view of only the plug connector of the connector assembly of FIG. 3.

FIG. 6 is a front elevation view of one of the clips of the connector assembly of FIG. 3.

FIG. 7 is a sectional view taken on the line 7—7 of FIG. 6.

FIG. 8 is a front elevation view of the receptacle connector of FIG. 1.

DESCRIPTION OF THE PREFERRED EMBODIMENT

Figure 1:
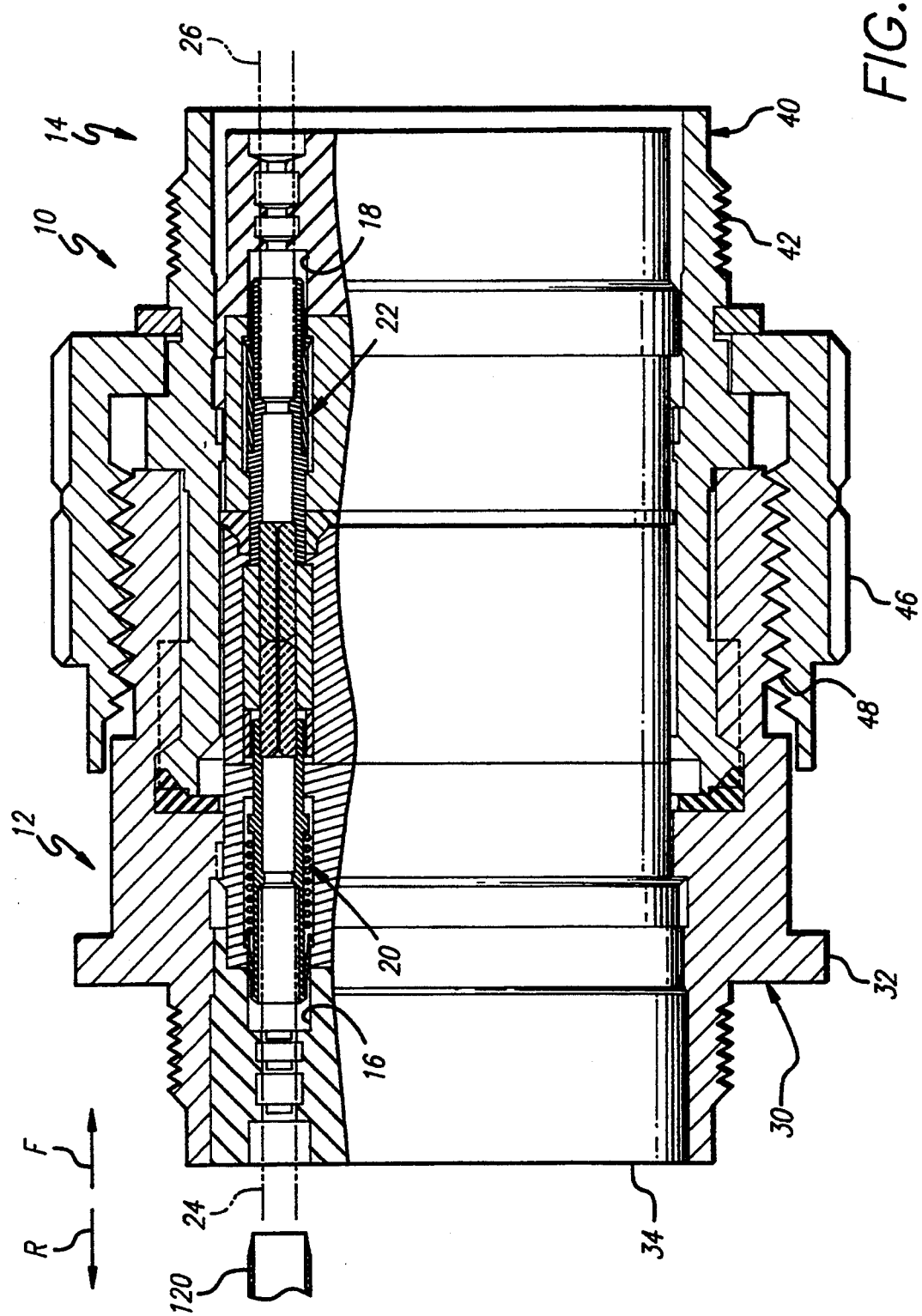
FIG. 1 is a partially sectional side view of a fiber optic connector assembly of the present invention which includes fully mated plug and receptacle connectors.

FIG. 1 illustrates a connector assembly 10 of the present invention, which includes receptacle and plug connectors 12, 14. Each connector includes a plurality of passages 16, 18, with a terminus 20, 22 in each passage. First and second cables 24, 26 are mounted on corresponding termini 20, 22 which optically connect the cables. The first connector 12 includes a housing 30 with a shell 32 that holds an insert assembly 34. The insert assembly forms the passages 16 that receive the receptacle termini 20. Similarly, the plug connector, or connector device 14 has a housing 40 that includes a shell 42 and an insert assembly 44 that forms the passages 18 for receiving corresponding plug termini 22. The connectors mate as shown, with a coupling nut 46 on the plug connector being threaded onto corresponding threads of the receptacle connector to keep them fully mated.

As shown in FIG. 3, the receptacle terminus 20 includes a body 50 having an axis 52 coincident with the passage axis and having front and rear end portions 54, 56. A ceramic ferrule 60 is attached to the front end portion of the body and has a front tip 62. The fiber optic cable 24 has a thin optical fiber 66 which extends through a hole in the ferrule 60, with the front end of the optical fiber generally being flush with the front tip 62 of the ferrule. The ferrules 60, 70 of the two connectors, and therefore the front ends of the corresponding optical fibers therein, abut each other to transmit light between them. A guide sleeve 72 which lies in the housing of the receptacle connector 12, keeps the ferrules precisely concentric.

The body 50 of the receptacle connector has front and rear flanges 80, 82 and has a cylindrical guide 84 extending between the flanges. A compression spring 86, which is preferably in the form of a helical wire spring, lies about the guide 84 and between the body flanges. The spring has a front end 90 that abuts the front flange 80, and has a rear end 92. The rear end 92 must be constantly pressed in a forward direction F to keep the receptacle ferrule 60 constantly biased forwardly, to assure constant firm contact of the tips of the ferrules 60, 70. An abutting device or clip device in the form of a clip 100 serves to abut the rear end of the spring 86. The clip also abuts a location on the receptacle housing 30 to prevent rearward movement of the clip in the direction R.

As shown in FIG. 4, the clip 100 has a rear part 102 mounted on the terminus body and has a plurality of tines such as 104, 105 that extend with a forward directional component and with a radially outward directional component (that is, radially away from the axis 52 of the clip, terminus body, and passage). Each tine has a free forward end or end portion 110 which forms a rearwardly-facing clip shoulder 112. The walls of the passage 16 form a corresponding forwardly-facing housing shoulder 114. When the tines are allowed to expand to the orientation shown, the clip and housing shoulders 112, 114 abut, to prevent the clip from moving rearwardly, so that it can support the rearward end 92 of the helical spring.

Applicant prefers to construct the clip so the forward ends 110 of the tines directly abut the rearward end 92 of the spring. This avoids the need for a sliding collar between them. Such a sliding collar must have a substantial length to avoid cocking, and would not only result in an extra part but would also increase the overall length of the terminus. However, if good contact cannot be obtained between the front end portions of the tines and the spring, then such an additional collar (which would be part of the abutting or clip device) could be used.

The terminus 20 must sometimes be removed to clean away debris such as that generated by wearing of parts when connectors are mated and unmated. Such removal is accomplished by inserting a tubular rear release tool 120 partially shown in FIG. 1, into the passage to closely surround the clip 100 (FIG. 4). As the release tool is inserted around the tines 104 of the clip, the tool deflects the tines radially inwardly (towards the axis 52) until the clip shoulder 112 no longer engages the housing shoulder 114. The entire terminus 20 then can be pulled out of the housing passage 16. Applicant prefers to construct the clip so when the tines are deflected substantially against the cylindrical body (with the clearance between them being no more than 0.1 mm) than the outside diameter of the tines is substantially no greater (within 0.1 mm) of the outside diameter of the installed spring.

It may be noted that the insert assembly 34 includes two metal (nickel coated aluminum) inserts 122, 124 and a silicon rubber grommet 126. The guide sleeve 72 is trapped within the front insert 122 by a retainer 125, and the ferrule 60 is pulled out of the guide sleeve when the terminus 20 is removed. When the terminus is removed, all of its parts can cleaned, including the clip 100. Furthermore, any of the parts, including the clip 100 can be replaced. The clip 100 may be installed from the front of the terminus.

FIG. 2 shows a prior art connector assembly A which included receptacle and plug connectors B, C. The prior art terminus D included a body E and a spring G around the body, with the front end of the spring abutting a front body flange or retaining ring H. An abutting device J included a rear release clip K and a collar L. The clip K was retained in the connector by a process such as heat staking. The clip had tines P extending forwardly and radially-inwardly (toward axis Q) to abut a rearwardly-facing shoulder on a flange S of the collar. The prior art terminus D was removed by inserting a rear release tool similar to that described above, to expand the clip tines P so the terminus could be removed.

The prior art arrangement shown in FIG. 2 had many disadvantages not in the present arrangement. The prior art clip K was not removable. Since the clip has bendable tines, it is more likely to be damaged than most parts of the connector. If a clip were damaged, then that passage of the connector could not be used. The non-removability of the clip (at least in the field) also prevented cleaning of the clip and more complete cleaning of the passage. Another important disadvantage of the prior arrangement is that the clip K had to be expandable to a sufficient diameter to readily pass the spring G without hangup on any of the turns of the helical spring. As a result, a clip with a larger inside diameter than the spring had to be used, and the widest passage part T had to be considerably wider than the spring outside diameter. Such large diameter of the passage part T resulted in considerable center-to-center spacing between adjacent passages and termini of the connector, so that a limited number of termini could be accommodated in a connector of given outside diameter. These clips K are normally installed in dielectric insulators to hold electrically conductive contacts, and the required spacing between clips to achieve dielectric isolation also tends to increase center-to-center spacing. It is noted that in many applications, there is only a limited space available for mounting the connector, so it is often desirable to be able to place as many termini as possible within a connector of predetermined size.

The present arrangement enables replacement of a damaged clip, because the clip is removed from the housing passage along with the rest of the terminus. The maximum inside diameter part 130 (FIG. 4) of the housing passage has to be only slightly wider than the outside diameter of the spring 86. That is, the clearance between the outside of the spring 86 and the passage wall at 130 only has to be great enough to form a shoulder 114 of sufficient width to reliably engage the clip tine shoulders, with additional slight clearance to enable removal of the spring 16. No additional space is required to accommodate the thickness of the clip. Also, because the clip is mounted on the terminus body 20, the clip can be mounted precisely concentric with the body, with the use of a metal housing insert enabling secure engagement of the shoulders with only a small area of abutment.

FIG. 5 illustrates details of the plug connector 14. The terminus 22 of the plug connector is identical with the terminus of the receptacle connector, except that applicant substitutes a spacer 140 for the helical spring of the receptacle connector. Alternatively, the spacer can be machined as a shoulder on the terminus body. Otherwise, all other parts of the plug terminus 22 are the same, with the body 142, clip 144, and ferrule 70 being identical to corresponding parts of the receptacle connector. The use of identical parts has the advantage of requiring fewer parts for assembly or repairs, and of avoiding confusion between similar but noncompatible parts.

FIGS. 6 and 7 illustrate details of the clip 100. The clip 100 may be formed of machined metal, or may be a stamping, with the rear part 102 being preferably formed substantially as a ring, but with a gap 150 in the ring to enable mounting of the clip on the terminus body. The clip has four times 104–107 which are substantially identical, in that each has an outer end 110 forming a corresponding rearwardly-facing shoulder 112. The tines extend at a forward and radially outward incline from the axis 52, of about 8°, when lying in the housing. The terms "forwardly-facing" shoulder and "rearwardly-facing" shoulder refer to shoulders that can securely abut to prevent rearward movement of the clip. FIG. 7 shows, in phantom lines, another shape of clip shoulder at 112X, wherein the shoulder faces both rearwardly and radially inwardly. However, since this shoulder 112X can securely abut the housing shoulder, the shoulder 112X can be considered to be a rearwardly-facing shoulder.

The terminus is constructed by machining the body 20 (FIG. 4) in the shape shown, with a hollow inside 160 having the different diameters shown for receiving different portions of the fiber optic cable, as is well known in the art. The spring 86 is installed by slightly expanding it to fit over the rear flange 82 of the body. The clip is installed by slightly expanding it so its ring-shaped rear part 102 can fit over the body rear flange 82. The terminus is pushed forwardly through (and expands) a hole 162 in the grommet 126, with the rear release tool (120) preferably used to compress the clip tines to facilitate movement through the grommet hole. The terminus is pushed forwardly until the clip shoulders 112 pass slightly forward of the housing shoulder 114 and snap out to press against the walls of the passage. The spring 86 is preferably compressed sufficiently to push the ferrule 60 forward of the position it will achieve after the connectors are mated. When the connectors are mated, the tip of the plug ferrule 70 advances to a fixed position, and deflects the receptacle ferrule 60 slightly rearwardly. Such rearward deflection of the receptacle ferrule 60 causes rearward deflection of the body 50 and slight additional compression of the spring 86, which is resisted by the clip 100. When the body moves slightly rearwardly while the clip does not move rearwardly, a slight gap shown at 164 in FIG. 3, opens between the rear of the clip and the rear flange 82. It would be possible to not have a rear body flange 82, although such a flange 82 is highly useful in keeping the clip in place.

FIG. 8 illustrates the front of the receptacle connector 12, with a guide sleeve and terminus shown only in one of the passages 16A. The particular connector shown has sixteen passages for holding sixteen corresponding termini. A similar connector of the prior art, which used a prior art clip K and collar L of the prior art, but with a ceramic ferrule of the same diameter, could accommodate only about ten passages and corresponding termini, in the same space.

Thus, the invention provides a fiber optic connector with an abutting device that can be removed from the rear of the connector, which enables the construction of a more compact connector, or one of given size with a greater number of termini, and which enables more complete removal of the terminus including a retention clip thereof, while minimizing the number of terminus parts. An abutting device which limits rearward movement of the rear end of a terminus spring, includes a clip mounted on the terminus body. The housing has a forwardly-facing shoulder, and the clip has a plurality of tines that each extends radially outwardly and forwardly. The clip tines have free ends with rearwardly-facing clip shoulders that abut the housing shoulder. The front end portions of the clip can directly engage the rear end of the spring to minimize the number of parts. The provision of a clip on the body, with the clip closely surrounding a part of the body having a smaller diameter than the outside of the spring, enables the clip to be readily removed with the rest of the terminus, and enables the clip-abutting passage to have a small diameter at its widest part.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A fiber optic terminus clip for mounting closely around a body of a terminus that lies in a connector housing, to prevent rearward movement of a spring around the body and thereby resist rearward body movement and to abut a forwardly-facing housing shoulder on the housing to support the clip against rearward movement, wherein:

said clip has a rear part which has an axis extending in forward and rearward directions and has a plurality of tines extending forwardly and radially outwardly away from said rear part, with each of a plurality of said tines having a free forward end portion forming a rearwardly-facing clip shoulder for engaging the forwardly-facing housing shoulder, and with said clip rear part having a gap which permits it to expand in diameter to fit onto said body.

2. A method for making a fiber optic terminus and installing it in a passage of a housing of a first connector, where the passage includes a forwardly-facing shoulder, by forming an elongated body having forward and rearward portions and a ferrule at said forward portion, with said body having forward and rearward flanges and a guide therebetween, and installing a compression spring having front and rear ends around said body guide between said flanges, characterized by:

forming a clip which has a rear end comprising a ring with an axis and with an opening in the ring, and with a plurality of tines extending from said ring and with each tine extending at a radially-outward and forward incline from said axis and with each tine having a front free end, including forming each tine free end with a rearwardly-facing clip shoulder on its radially outer surface;

spreading said ring opening of said clip and installing said clip around said guide of said body, with said ring abutting said body rear flange and said tine clip withstanding the rearward force of said spring;

pushing said terminus forwardly into said passage until said tine shoulders lie slightly forward of said housing shoulder, and allowing said tine shoulders to abut said housing shoulder.

3. The method described in claim 2 including:

forming said tine free ends so they can directly abut said spring rear end when said tines are fully expanded in said passage with said tine shoulders and housing shoulder abutting, and allowing said tine free ends to directly abut said spring rear end.

4. The method described in claim 2 including:

forming a second connector which can mate with said first connector, wherein said second connector has a second housing device with a passage that has a forwardly-facing shoulder, and forming an optical fiber second terminus device and installing it in said passage of said housing device, wherein:

said step of forming said second terminus device includes using parts identical to those of said terminus of said first connector, except that a substantially noncompressible spacer is substituted for said spring.

5. A fiber optic first connector which includes a housing having a passage and a terminus lying in said passage, said terminus including a body having an axis and front and rear end portions and a front flange, a compression spring with front and rear spring ends disposed about said body rearward of said front flange, with said front spring end abutting said front flange, and an abutting device which is supported by said housing and which abuts said rear spring end to resiliently bias said body forwardly, characterized by:

said abutting device comprises a clip mounted on said body, said housing having a forwardly-facing shoulder lying adjacent to said clip, and said clip having a part that abuts said housing shoulder;

said clip part which abuts said housing shoulder comprises a plurality of tines each extending radially outwardly and forwardly and having free forward ends with rearwardly-facing clip shoulders abutting said housing shoulder, so said clip can be released by radially inward deflection of said tines;

said body has a rear flange that lies rearward of said clip, said clip is slidable on said body, and said clip has a rear end substantially in the form of a ring which abuts said rear flange when said clip slides rearwardly relative to said body.

6. A combination of a fiber optic terminus clip device and a terminus body that can lie in a connector housing, to prevent rearward movement of a spring that lies around the body and thereby resist rearward body movement and to abut a forwardly-facing housing shoulder on the housing to support the clip against rearward movement, comprising:

a clip having a rear part which has an axis extending in forward and rearward directions and having a plurality of tines extending forwardly and radially outwardly away from said rear part, with each of a plurality of said tines having a free forward end portion forming a rearwardly-facing clip shoulder for engaging the forwardly-facing housing shoulder;

said terminus body has an axis that is coincident with said clip axis, and said body has forward and rearward flanges and a guide therebetween:

a spring lying around said body guide and having a front spring end abutting said front flange and a rear spring end;

said clip lies around and is slidable along said body guide, with said clip rear part of a size to abut said rear flange and with said tine forward ends abutting said spring rear end.

7. A fiber optic connector comprising:

a housing having a passage;

a terminus lying in said housing passage, said terminus including a body having an axis and front and rear end portions and having front and rear flanges;

a compression spring with front and rear spring ends disposed about said body rearward of said front flange, with said front spring end abutting said front flange;

a clip slidably mounted on said body and having a rear end that can abut said rear flange of said body, said housing having a forwardly-facing shoulder lying adjacent to said clip, and said clip having a part that abuts said housing shoulder;

said clip part which abuts said housing shoulder, comprises a plurality of tines each extending radially outwardly and forwardly and having a free forward end with a rearwardly-facing clip shoulder abutting said housing shoulder, so said clip can be released by radially inward deflection of said tines.

8. The connector described in claim 7 wherein:

said clip has a rear portion which closely surrounds said body, and said clip rear portion has a gap that allows it to be expanded to mount on said body between said front and rear flanges thereof.

9. A fiber optic connector assembly comprising:

a first fiber optic connector which includes a housing having a passage and a terminus lying in said passage, said terminus including a body having an axis and front and rear end portions and a front flange, a compression spring with front and rear spring ends disposed about said body rearward of said front flange, with said front spring end abutting said front flange, and an abutting device which is supported by said housing and which abuts said rear spring end to resiliently bias said body forwardly;

a second connector which is constructed to mate with said first connector, said second connector having a housing with a passage and a second terminus lying therein, said second terminus having a second body with a front flange and having a second abutting device which are identical respectively with said body and abutting device of said first connector, with said second body having about the same length as said first body, but said second connector having a substantially non-resiliently compressible spacer lying between said front flange of said second body and said second clip instead of a coil spring, and said second abutting device abutting an end of said spacer.

* * * * *